US011780162B2

(12) United States Patent
Fitzpatrick et al.

(10) Patent No.: US 11,780,162 B2
(45) Date of Patent: Oct. 10, 2023

(54) THREE-DIMENSIONAL PARTS MADE BY ADDITIVE MANUFACTURING USING A COATING COMPOSITION ON THE BUILD SURFACE

(71) Applicant: Henkel AG & Co. KGaA, Duesseldorf (DE)

(72) Inventors: Darragh Fitzpatrick, County Kildare (IE); David Branagan, Dublin (IE); Lisa Kennedy, County Meath (IE); Gavin Minton, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 161 days.

(21) Appl. No.: 17/326,161

(22) Filed: May 20, 2021

(65) Prior Publication Data

US 2021/0268731 A1   Sep. 2, 2021

Related U.S. Application Data

(63) Continuation of application No. PCT/EP2019/081679, filed on Nov. 18, 2019.

(30) Foreign Application Priority Data

Nov. 20, 2018   (GB) ..................................... 1818897

(51) Int. Cl.
*B29C 64/30* (2017.01)
*C09D 5/00* (2006.01)
*B29C 64/188* (2017.01)
*B33Y 10/00* (2015.01)
*B33Y 70/00* (2020.01)
(Continued)

(52) U.S. Cl.
CPC .......... *B29C 64/188* (2017.08); *B29C 64/124* (2017.08); *B29C 64/245* (2017.08); *B29C 64/264* (2017.08); *B29C 64/30* (2017.08); *B29C 64/40* (2017.08); *B29C 71/0009* (2013.01); *B29C 71/02* (2013.01); *B33Y 10/00* (2014.12); *B33Y 40/20* (2020.01); *B33Y 70/00* (2014.12); *C09D 5/00* (2013.01); *B29C 35/0805* (2013.01); *B29C 2035/0827* (2013.01); *B29K 2033/08* (2013.01); *B29K 2105/0002* (2013.01)

(58) Field of Classification Search
CPC .......................... B29C 64/40; B29C 33/56–68
See application file for complete search history.

(56) References Cited

U.S. PATENT DOCUMENTS

| | | | |
|---|---|---|---|
| 5,380,387 A | | 1/1995 | Salamon et al. |
| 5,503,785 A | * | 4/1996 | Crump .................. B33Y 40/20 264/308 |

(Continued)

FOREIGN PATENT DOCUMENTS

| | | |
|---|---|---|
| WO | 2015149054 | 10/2015 |
| WO | 2016161194 | 10/2016 |
| WO | 2018118832 | 6/2018 |

OTHER PUBLICATIONS

PCT International Search Report in connection with International Patent Application No. PCT/EP2019/081679—dated May 28, 2020.

*Primary Examiner* — Atul P. Khare
(74) *Attorney, Agent, or Firm* — Steven C. Bauman

(57) ABSTRACT

Provided herein are methods for making three-dimensional parts by additive manufacturing using a debondable curable coating composition on the build surface.

19 Claims, 2 Drawing Sheets

(51) Int. Cl.
   *B29C 64/264*   (2017.01)
   *B29C 64/124*   (2017.01)
   *B29C 64/245*   (2017.01)
   *B33Y 40/20*    (2020.01)
   *B29C 71/00*    (2006.01)
   *B29C 71/02*    (2006.01)
   *B29C 64/40*    (2017.01)
   *B29K 33/00*        (2006.01)
   *B29K 105/00*       (2006.01)
   *B29C 35/08*        (2006.01)

(56) References Cited

U.S. PATENT DOCUMENTS

| | | | |
|---|---|---|---|
| 10,967,563 B2* | 4/2021 | Jeng | C08K 5/1545 |
| 2002/0153640 A1 | 10/2002 | John | |
| 2002/0155189 A1 | 10/2002 | John | |
| 2005/0058837 A1* | 3/2005 | Farnworth | G03F 7/0037 |
| | | | 428/421 |
| 2016/0075091 A1 | 3/2016 | Cable | |
| 2016/0288376 A1* | 10/2016 | Sun | A61C 13/0019 |
| 2016/0332387 A1 | 11/2016 | Jondal et al. | |

\* cited by examiner

THREE-DIMENSIONAL PARTS MADE BY ADDITIVE MANUFACTURING USING A COATING COMPOSITION ON THE BUILD SURFACE

BACKGROUND

Field

Provided herein are methods for making three-dimensional parts by additive manufacturing using a debondable curable coating composition on the build surface.

Brief Description of Related Technology

Additive manufacturing is fast becoming a viable alternative to traditional manufacturing techniques and in some cases the only practical alternative for making complex parts.

One draw back to additive manufacturing is the ability to quickly and easily removing the printed part from the build substrate without damaging the printed part, the build substrate or both. Attempts have been made in the past to address the issue. To date none are believed to be without their own drawbacks.

US Patent Application Publication No. US 2016/0075091 provides for the removal of an object produced by depositing a material, layer-by-layer by an additive manufacturing process, onto a surface of a substrate without mechanically contacting the object with a device or chemically contacting the object. Here, removal of the object from the substrate can be accomplished by flexing or bending the substrate. The substrate can be configured to elastically deform in response to a load applied to the sheet causing a deflection at a center of the sheet in an amount of at least about 12 mm and/or the sheet to have a radius of curvature that is less than or equal to about 305 mm.

US Patent Application Publication No. US 2016/0332387 provides for a device for removing a 3D print from a build plate of a 3D printer comprising a substantially flat sheet of flexible material of sufficient size to receive and hold deposits of print material from the 3D printer, where the sheet of flexible material accommodates repeated flexing without fracturing and without loss of the substantially flat disposition, is removably placed atop the build plate of the 3D printer prior to the printing process, and has a top surface that is textured to prevent the 3D print from moving on the sheet of flexible material during the printing process; and a means for preventing movement of the sheet while atop the build plate of the 3D printer and during the printing process.

U.S. Pat. No. 7,195,472 (John) is directed to and claims: An apparatus for the separation of a material layer that is hardened on a flat plane, which serves as a reference, the apparatus comprising: a layer of a flexible, elastic separating film arranged between the flat plane and the material layer, where the film does not adhere to the plane and where a gaseous or liquid medium can flow between the film and the plane, either where the flat plane has a surface facing the film, and the surface comprises a certain surface roughness to ensure supply or removal of the medium; or where the film has a surface facing the plane, the surface comprising a microstructure to ensure supply or removal of the medium.

U.S. Pat. No. 7,052,263 (Hendrik) is directed to and claims an apparatus for manufacturing a three-dimensional object by solidifying in layers a liquid material which can be solidified under the influence of light at locations corresponding to the cross-section of the object in a layer. The apparatus comprises: a trough for holding the liquid material over a transparent plate; a light source; a device for projecting an area of light onto a surface of the liquid material in contact with a resilient layer selected from a solid resilient material having the properties of silicone according to a cross-section of the object to solidify the liquid material exposed by the light in accord with the cross-section; and a positioning device for positioning the object being formed relative to the trough for forming additional layers of the object. The trough comprises a surface layer where the solidified material sticks to the surface layer less than to the transparent plate. The '263 patent indicates that "[i]t is crucial that the resilient layer 9 is made of a material to which the polymerisable material 11 sticks less than to the transparent bottom plate 8 after polymerisation."

U.S. Pat. No. 5,380,387 (Salamon) is directed to a method of bonding a lens blank to a lens blank block for subsequent working. The method involves the use of an adhesive material comprising from about 45 to about 80% by weight of an acrylic capped organic prepolymer resin terminated at both ends with acrylic functionality, from about 5 to about 35% by weight of a monofunctional ethylenically unsaturated diluent monomer, up to about 6% by weight of a non-reactive releasing agent and from about 0.001 to about 5% by weight of a photoinitiator and wherein the acrylic capped organic prepolymer resin is selected from the group consisting of (meth)acrylated urethane, (meth)acrylated polyester urethane (meth)acrylated polyepoxide, (meth)acrylated poly(alkyleneoxide), (meth)acrylated polybutadiene and mixtures thereof. Henkel Corporation has sold a product for this purpose under the trade name COLD BLOC 3792.

Notwithstanding the state of the art it would be desirable to facilitate the facile removal from the build substrate of a three-dimensional part without damaging either the part or the build substrate using a coating composition that adheres to the build substrate and the resin used in the three dimensional printing process and releases from the build substrate and the three dimensional printed part under mild torque force.

SUMMARY

These desires are satisfied by the present invention.

Whereas in the past, a three-dimensionally printed part would need to be removed from the build surface by flexing or bending the surface or using conventional mechanical scrapers, this invention avoids potentially destructive measures to the so-formed part or the surface itself and provides a method that treats the surface prior to printing with a curable coating composition, which when cured forms a debondable coating to facilitate part removal and maintain the integrity of the part as it is removed from the build surface.

The curable coating composition is able to form a cured coating when exposed to appropriate curing conditions, and is able to receive a three dimensional printing resin and have a three dimensional part formed on the cured coating. In addition, through the use of the curable coating composition, the three dimensional printed part may be released from the build surface with less force than without curable coating composition present on the build surface.

The invention captures a method of facilitating the removal from a build substrate of a three-dimensional printed part made by additive manufacturing. The method includes the steps of:

A. Disposing onto at least a portion of a surface of the build substrate a curable coating composition;

B. Exposing the curable coating composition to radiation in the electromagnetic spectrum suitable to form a cured curable coating composition;

C. Performing additive manufacturing using a resin to form a three-dimensional part on the cured coating composition disposed on the build substrate, said three-dimensional printed part made according to data indicating a pre-determined pattern; and D. Removing the so-formed part from the build substrate.

After step C but before step D, the method may include conditioning the so-formed three-dimensional printed part under one or more of the following:
(i) exposing the so-formed three dimensional printed part to a temperature in the range of from about 45° C. to about 80° C., suitably in the range of from about 50° C. to about 70° C., such as a temperature of about 60° C.,
(ii) exposing the so-formed three-dimensional printed part to water at a temperature in the range of from about 45° C. to about 80° C., suitably in the range of from about 50° C. to about 70° C., such as a temperature of about 60° C., or
(iii) exposing the so-formed three-dimensional printed part to aqueous detergent at a temperature of from about 15° C. to about 40° C., for example at room temperature. Each of (i) to (iii) may be carried out for a period of time of from about 10 minutes to about 60 minutes, such as from about 20 minutes to about 40 minutes, for example for about 30 minutes.

Also, the method may optionally further comprise after step D, removing from the three dimensional printed part the cured curable composition formed in step B.

Advantageously, the curable coating composition is photocurable and cure of said composition can be effected rapidly by exposure to electromagnetic radiation, for example by exposure to UV light. The rapid cure is particularly advantageous in the context of manufacturing at scale, for example in a factory setting.

DETAILED DESCRIPTION

Figure 1:
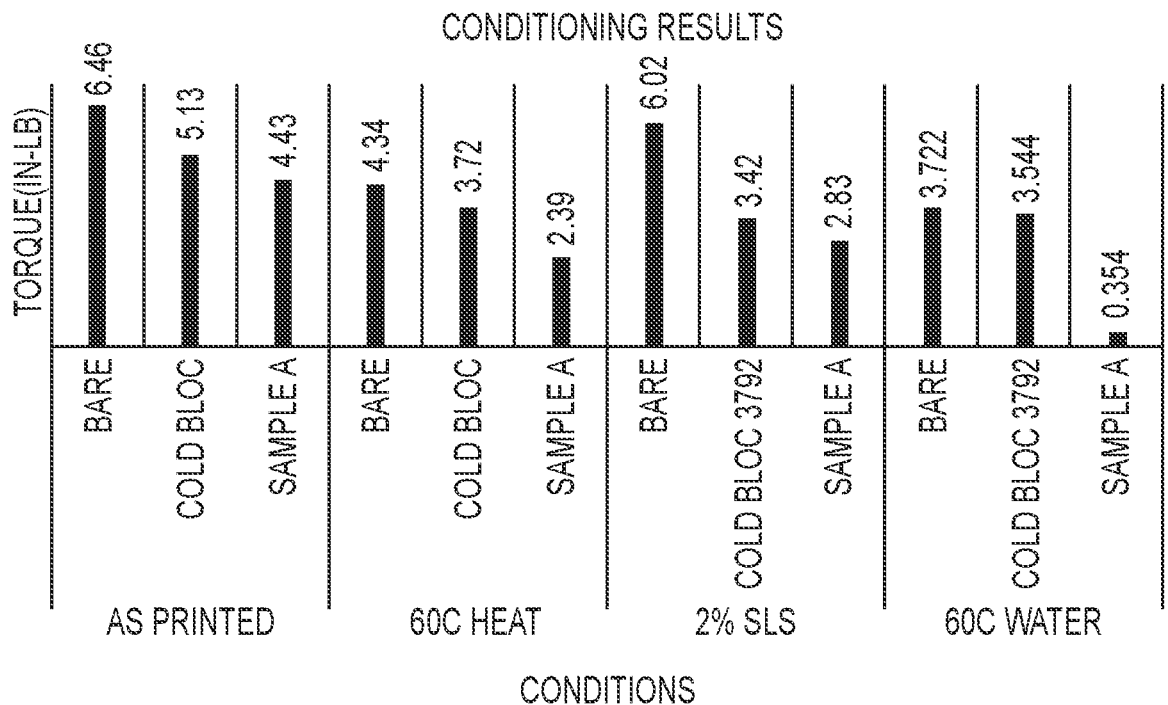
FIG. 1 depicts a bar chart of aggregated torque values on the Y axis against the various samples on the bare build substrate, after 60° C. conditioning, after 60° C. water conditioning, and after aqueous surfactant conditioning.

As noted above, the present invention provides a method of facilitating the removal from a build substrate of a three-dimensional printed part made by additive manufacturing. The method includes the steps of:
A. Disposing onto at least a portion of a surface of the build substrate a curable coating composition;
B. Exposing the curable coating composition to radiation in the electromagnetic spectrum suitable to form a cured curable coating composition;
C. Performing additive manufacturing using a resin to form a three-dimensional part on the cured coating composition disposed on the build substrate, said three-dimensional printed part made according to data indicating a pre-determined pattern; and
D. Removing the so-formed part from the build substrate.

After step C but before step D, the method may include conditioning the so-formed three-dimensional printed part under one or more of the following:
(i) exposing the so-formed three dimensional printed part to a temperature in the range of from about 45° C. to about 80° C., suitably in the range of from about 50° C. to about 70° C., such as a temperature of about 60° C.,
(ii) exposing the so-formed three-dimensional printed part to water at a temperature in the range of from about 45° C. to about 80° C., suitably in the range of from about 50° C. to about 70° C., such as a temperature of about 60° C., or
(iii) exposing the so-formed three-dimensional printed part to aqueous detergent at a temperature of from about 15° C. to about 40° C. (for example at room temperature); each of (i) to (iii) may be carried out for a period of time of from about 10 minutes to about 60 minutes, such as from about 20 minutes to about 40 minutes, for example for about 30 minutes. For example the so-formed three-dimensional printed part may be conditioned by exposure to one of: (a) 60° C. temperature, (b) 60° C. hot water or (c) aqueous detergent at room temperature, each for a period of time of about 30 minutes.

After step D, the method optionally includes removing from the three dimensional printed part the cured curable composition formed in step B.

The curable coating component may comprise a (meth) acrylate component. The (meth)acrylate component may be a combination of (meth)acrylate-functionalized oligomers, polymers or resins and/or (meth)acrylate monomers. For instance, (meth)acrylate-functionalized organic prepolymer resins and monofunctional (meth)acrylate monomers may be used in combination.

The (meth)acrylate-functionalized oligomers, polymers or resins may be selected from (meth)acrylate-functionalized urethanes, (meth)acrylate-functionalized polyester urethanes, (meth)acrylate-functionalized polyepoxides, (meth) acrylate-functionalized poly(alkyleneoxides), and (meth) acrylate-functionalized polybutadienes, or combinations thereof.

Examples of such (meth)acrylate-functionalized oligomers, polymers or resins include acrylated or (meth)acrylated polyester urethanes, acrylated or (meth) acrylated polyether urethanes, and acrylate or (meth)acrylate esters prepared by reaction of (meth)acrylic acid with a polyepoxide resin, and acrylated or (meth)acrylated butadienes, and combinations thereof.

The (meth)acrylate-functionalized oligomers, polymers or resins may be present in an amount of about 30 to about 80 percent by weight, such as from about 45 to about 80 percent by weight, suitably from 50 to about 70 percent by weight, for example from about 55 to about 70 percent by weight. (In relation to the curable coating composition of the invention, unless otherwise stated all percent by weight values are based on the total weight of the curable coating composition.)

The (meth)acrylate-functionalized oligomers, polymers or resins are curable by exposure to radiation in the electromagnetic spectrum. Examples of such resins are disclosed in for example U.S. Pat. Nos. 4,574,138; 4,439,600; 4,380,613; 4,309,526; 4,295,909 and 4,018,851.

The (meth)acrylate monomers be selected from a host of compounds. For instance, tetrahydrofurfural (meth)acrylate, hydroxyethyl (meth)acrylate, hydroxypropyl (meth) acrylate, isobornyl acrylate, butylene glycol diacrylate, diethylene glycol diacrylate, hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, di pentaerythritol pentaacrylate, pentaerythritol triacrylate and their corresponding (meth)acrylate compounds may be used.

The (meth)acrylate monomers may be present in an amount of about 5 to about 35 percent by weight, such as about 10 to about 25 percent by weight.

Suitably, the curable coating composition comprises one or more (meth)acrylate monomers having a plurality of (meth)acrylate groups. Optionally, the one or more (meth) acrylate monomers having a plurality of (meth)acrylate groups may be present in an amount of from about 0.01 to about 3 percent by weight, suitably, in an amount of from about 0.1 to about 3 percent by weight, such as from about 0.5 to about 2.5 percent by weight, based on the total weight of the curable coating composition.

Suitable (meth)acrylate monomers having a plurality of (meth)acrylate groups include 1,3-butylene glycol diacrylate, diethylene glycol diacrylate, 1,6-hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, dipentaerythritol pentaacrylate, pentaerythritol triacrylate and their corresponding (meth) acrylate compounds. Especially preferred are the tri and higher polyacrylates, including, for example, trimethylolpropane triacrylate and dipentaerythritol pentacrylate.

A release agent may be included in the curable coating composition. The release agent should not react with the (meth)acrylate-functionalized oligomers, polymers or resins or the (meth)acrylate monomers. The release agent may include fatty alcohols, alkoxylated fatty alcohols, fatty acid amides, fatty acid esters, metallic soaps, parrafin and polyethylene waxes and vinyl esters of unsaturated oils, such as vinyl stearate, vinyl palmitate, and combinations thereof.

The release agent may be present in an amount of about 0.5 to about 10 percent by weight.

A photoinitiator may be included in the curable coating composition. Many photoinitiators may be used, including acetophenone and derivatives thereof, such as dichloroacetophenone, trichloroacetophenone, dialkoxyacetophenone, 2,2-dimethoxy-2-phenylacetophenone and 4-dial kylaminoacetophenone; benzophenone and derivatives thereof, such as 4,4'-bis(dimethylamino)benzophenone (Michler's ketone) and 4,4'-bis(diethylamine)benzophenone; benzil; benzoin and derivatives thereof, such as benzoin alkyl ether; benzildimethylketal; benzoylbenzoate; alphaacyloxime esters; thioxanthone and derivatives thereof, such as 2-chlorothioxanthone and diethylthioxanthone; azo-compounds, such as azobisisobutyronitrile; benzoyl peroxide; camphoquinone; and phosphine oxides, such as diphenyl-2,4,6-trimethylbenzoylphosphine oxide, with and without 1-benzoyl-cyclohexanol. Desirable ones are the phosphine oxides, such as triphenyl phosphine oxide and bisacyl phosphine oxide.

The photoinitiator may be present in an amount of about 0.5 to about 10 percent by weight.

The curable coating compositions may further include a variety of optional components, including fillers and colorants. Fillers include silicas, such as fumed silica, which may be untreated or surface treated. When treated, the surface treatments include hexamethylenedisilizane or polydimethylsiloxane to increase hydrophobicity. When used, the silica may be present in an amount of about 0.5 to about 10 percent by weight.

The person skilled in the art will appreciate that the curable coating composition is distinct from the composition employed to form the three-dimensional printed part.

Suitably, the curable coating composition comprises:
(a) a (meth)acrylate component comprising:
  (i) one or more (meth)acrylate-functionalised oligomers, polymers or resins selected from (meth)acrylate-functionalized urethanes, (meth)acrylate-functionalized polyester urethanes, (meth)acrylate-functionalized polyepoxides, (meth)acrylate-functionalized poly(alkyleneoxides), and (meth)acrylate-functionalized polybutadienes, or combinations thereof; and
  (ii) one or more (meth)acrylate monomer components;
(b) optionally, a release agent; and
(c) a photoinitiator.

More suitably, the curable coating composition comprises:
(a) a (meth)acrylate component comprising:
  (i) (meth)acrylate-functionalised oligomers, polymers or resins selected from (meth)acrylate-functionalized urethanes, (meth)acrylate-functionalized polyester urethanes, (meth)acrylate-functionalized polyepoxides, (meth)acrylate-functionalized poly(alkyleneoxides), and (meth)acrylate-functionalized polybutadienes, or combinations thereof; wherein the (meth)acrylate-functionalised oligomers, polymers or resins, are present in an amount of from about 30 to about 80 percent by weight and
  (ii) (meth)acrylate monomers present in an amount of from about 10 to about 50 percent by weight;
(b) optionally, a release agent present in an amount of from about 0.5 to 10 percent by weight; and
(c) a photoinitiator present in an amount of from about 0.001 to about 5 percent by weight, based on the total weight of the curable coating composition.

The curable coating composition may be applied on a surface of the build substrate at a thickness in the range of about 0.5 mm to about 2 mm, such as about 1 mm. Any method of application of the curable coating composition may be used, provided at least a portion of the surface of the build substrate on which the three dimensional part is to be printed is coated.

The curable coating composition may be cured by exposure to radiation in the electromagnetic spectrum. The chosen intensity, duration and wavelength ordinarily depends upon the specific photoinitiator or photoinitiator/photosensitizer system employed. Generally, an exposure of about 5 seconds to 5 minutes or more, preferably from about 30 seconds to about 90 seconds, at 30 mW/cm$^2$ in the range of from about 200 to 450 nm, such as from about 350 to 420 nm, for example at 365 nm or 405 nm, will be sufficient to polymerize the photopolymerizable monomer(s) and thereby cure the curable coating composition. Suitably, the curable coating composition may be cured by exposure to ultraviolet radiation emitted by a LED source at 405 nm.

Advantageously, the curable coating composition is cured by exposure to electromagnetic radiation, such as UV light. Conventional methods for protecting a build substrate include maintaining uncured layers of liquid between the cured object and the printed article. This is not a viable solution in particular in the context of stereolithographic additive manufacturing, where the build substrate may be immersed in a bath of resin. Employing a photocurable coating composition to facilitate cure is particularly advantageous in the context of SLA printers which will include a source of UV light.

When the curable coating composition is cured, it is readily debondable, such as from the build substrate and/or the three dimensional printing part. The cured curable coating composition is debondable under a torque force, such as a torque force of less than about 6 in-lb (~0.68 N·m) with no active post processing conditioning. (All measurements are made in in-lb and then converted to N·m so the in-lb value takes precedence over the N·m value if there is any inconsistency.) When active post processing conditions are used, cured curable coating composition is debondable from the surface of the build substrate under a torque force of less than about 4 in-lb (~0.45 N·m), for example, the cured curable coating composition may be debondable from the surface of the build substrate under a torque for of less than about 4 in-lb (~0.45 N·m) after conditioning the so-formed three-dimensional printed part under one or more of the following:

(i) exposing the so-formed three dimensional printed part to a temperature in the range of from about 45° C. to about 80° C., suitably in the range of from about 50° C. to about 70° C., such as a temperature of about 60° C., (ii) exposing the so-formed three-dimensional printed part to water at a temperature in the range of from about 45° C. to about 80° C., suitably in the range of from about 50° C. to about 70° C., such as a temperature of about 60° C., or (iii) exposing the so-formed three-dimensional printed part to aqueous detergent at a temperature of from about 15° C. to about 40° C., for example at room temperature. Each of (i) to (iii) may be carried out for a period of time of from about 10 minutes to about 60 minutes, such as from about 20 minutes to about 40 minutes, for example for about 30 minutes. Suitably, the aforementioned conditioning (i) to (iii) above facilitates debonding of the cured curable composition from the build substrate under a torque force of less than about 3.8 in-lb (~0.43 N·m), such as less than about 3.5 in-lb (~0.40 N·m), preferably less than about 3 in-lb (~0.34 N·m). For example, the cured curable composition may be debondable from the surface of the build substrate under a torque for of less than about 4 in-lb (~0.45 N·m) after conditioning the so-formed three-dimensional printed part with heat or aqueous detergent post processing conditioning for a period of time of about 30 minutes. Similarly, the cured curable coating composition is debondable from the surface of the build substrate under a torque force of less than about 3 in-lb (~0.34 N·m) with 60° C. hot water post processing conditioning for a period of time of about 30 minutes.

EXAMPLES

In the examples, a Form 2 Printer (available from Formlabs Inc., Somerville, Mass.) was used to print parts in the shape of a hexagonal nut dimensioned 1" (2.54 cm) per side×½" (1.27 cm) in the Z direction. Formlabs White Resin™, which is promoted as a photopolymer resin having a combination of (meth)acrylated oligomers, (meth)acrylated monomers, acrylated monomers, and a photoinitiator, was used as the resin for printing. Prior to printing, the build surface was either not coated, or coated with a curable coating composition. The build surface here is constructed of aluminum.

Three sets of five hexagonal nuts were printed on the build surface. Once printing was complete, the parts were removed from the build surface using a torsiometer giving a reading of torque strength in inch-lbs. A 22 mm socket was attached to the torsiometer. The torsiometer operates by allowing the user to select a torque wrench add-on between the maximum and minimum force would be required to remove the printed hexagonal nut.

The hexagonal nuts were printed either (1) directly on the build surface or (2) directly onto a layer of curable coating composition, which was cured by exposure to UV light at a wavelength of 405 nm using a LED LOCTITE™-branded Flood System. The curable coating composition was either COLD BLOC 3792™ (including a proprietary acrylate glycol and a proprietary acrylate monomer, each in an amount of 10-30 percent by weight, and a proprietary acrylate in an amount of 0.1-1 percent by weight, as reported by the manufacturer Henkel Corporation, Rocky Hill, Conn.) or a curable coating composition made from a (meth)acrylate component having as constituents polyethylene glycol diacrylate in an amount of greater than about 25 to less than about 50 percent by weight, isobornyl acrylate in an amount of greater than about 10 to less than about 50 percent by weight and 2-hydroxyethyl acrylate in an amount greater than about 0.25 to less than about 2.5 percent by weight, and as a photoinitiator, phenyl bis(2,4,6-trimethylbenzoyl)-phosphine oxide.

The torque test was used to measure the different amounts of force required to remove the three dimensional printed hexagonal nuts. Thus, force was applied to these printed hexagonal nuts at room temperature, here with no additional conditioning of the parts once printed. The results of the torque tests are recorded below in Table 1.

TABLE 1

| M22 | Torque Off Strengths (in-lb(N · m)) | | |
|---|---|---|---|
| Hexagonal Nuts As Printed | Bare | COLD BLOC 3792 | Sample A |
| 1 | 7.08 (0.8) | 4.86 (0.549) | 3.98 (0.45) |
| 2 | 6.64 (0.75) | 4.86 (0.549) | 4.43 (0.501) |
| 3 | 5.75 (0.65) | 5.31 (0.6) | 4.43 (0.501) |
| 4 | 7.08 (0.8) | 5.31 (0.6) | 4.43 (0.501) |
| 5 | 5.75 (0.65) | 5.31 (0.6) | 4.87 (0.55) |
| Average | 6.46 (0.73) | 5.13 (0.58) | 4.43 (0.501) |

On average, the three dimensional printed hexagonal nuts required 6.46 in-lb (0.74 N·m) force for removal from the bare build surface. A coating of COLD BLOC 3792 on the build surface reduced the force required for removal to 5.13 in-lb (0.58 N·m). A coating of Sample A reduced further the force required for removal to 4.43 in-lb (0.501 N·m). Sample A thus reduced the force requirements from the bare surface by nearly about 32% and from the COLD BLOC 3792 coated surface by nearly about 14%.

In addition to reducing the force requirements for removal, such force reduction could lead to less damage to the integrity of the surface finish or structural characteristics of the three dimensional part.

Three additional sets of 5 hexagonal nuts were printed as above. Torque tests were once again performed, though now with different post printing conditioning protocols. In each case, the build surface on which the three dimensional part was printed was placed in the conditioning environment.

Conditioning of the next group of three replicates of 5 hexagonal nuts was by way of elevated temperature only. Here, the temperature of an oven chamber was set at 60° C.

and the replicates remained at that temperature for 30 minutes. Immediate torque testing followed, with the results captured below in Table 2.

TABLE 2

| M22 Hexagonal Nuts, as Printed and Conditioned in Dry Heat at 60° C. | Torque Off Strengths (in-lb(N · m)) | | |
|---|---|---|---|
| | Bare | COLD BLOC 3792 | Sample A |
| 1 | 4.87 (0.55) | 2.67 (0.302) | 2.66 (0.301) |
| 2 | 5.31 (0.6) | 4.43 (0.501) | 2.21 (0.25) |
| 3 | 3.98 (0.45) | 4.43 (0.501) | 3.54 (0.4) |
| 4 | 3.10 (0.35) | 4.43 (0.501) | 1.77 (0.2) |
| 5 | 4.43 (0.501) | 2.66 (0.301) | 1.77 (0.2) |
| Average | 4.34 (0.501) | 3.72 (0.42) | 2.39 (0.27) |

The data in Table 2 shows a similar trend to that captured in Table 1. That is, the amount of torque force required to remove the hexagonal nuts from the build surface due to the dry heat conditioning is progressively reduced through the use of COLD BLOC 3792 and Sample A. COLD BLOC 3792 thus reduced the force requirements from the bare surface by nearly about 14% and from the Sample A coated surface by nearly about 45%.

Conditioning of the next group of three replicates of 5 hexagonal nuts was by way of submergence in an aqueous based detergent containing the surfactant, sodium lauryl sulfate ("SLS"), for 30 minutes at room temperature. Immediate torque testing followed, with the results captured below in Table 3.

TABLE 3

| M22 Hexagonal Nuts, as Printed and Conditioned in 2% SLS | Torque Off Strengths (in-lb(N · m)) | | |
|---|---|---|---|
| | Bare | COLD BLOC 3792 | Sample A |
| 1 | 6.20 (0.701) | 3.98 (0.45) | 1.77 (0.2) |
| 2 | 5.75 (0.65) | 4.42 (0.499) | 2.66 (0.301) |
| 3 | 5.31 (0.6) | 4.42 (0.499) | 3.10 (0.35) |
| 4 | 6.64 (0.75) | 4.42 (0.499) | 3.10 (0.35) |
| 5 | 6.20 (0.701) | 2.66 (0.301) | 3.54 (0.4) |
| Average | 6.02 (0.68) | 3.42 (0.386) | 2.83 (0.32) |

The data in Table 3 shows a similar trend to that captured in Tables 1 and 2. That is, the amount of torque force required to remove the hexagonal nuts from the build surface due to the aqueous detergent conditioning is progressively reduced through the use of COLD BLOC 3792 and Sample A. COLD BLOC 3792 thus reduced the force requirements from the bare surface by nearly about 43% and from the Sample A coated surface by about 53%.

Conditioning of the next group of three replicates of 5 hexagonal nuts was by submergence in a heated water bath at 60° C. and the replicates remained at that temperature for 30 minutes. Immediate torque testing followed, with the results captured below in Table 4.

TABLE 4

| M22 Hexagonal Nuts, as Printed and Conditioned in a 60° C. Water Bath | Torque Off Strengths (in-lb (N · m)) | | |
|---|---|---|---|
| | Bare | COLD BLOC 3792 | Sample A |
| 1 | 2.66 (0.301) | 3.54 (0.4) | 1.77 (0.2) |
| 2 | 4.43 (0.501) | 2.66 (0.301) | 0.00 (0) |
| 3 | 4.43 (0.501) | 4.43 (0.501) | 0.00 (0) |
| 4 | 4.43 (0.501) | 4.43 (0.501) | 0.00 (0) |
| 5 | 2.66 (0.301) | 2.66 (0.301) | 0.00 (0) |
| Average | 3.72 (0.42) | 3.54 (0.4) | 0.35 (0.04) |

The data in Table 4 shows a similar trend to that captured in Tables 1-3, but much less pronounced with COLD BLOC 3792 and even more pronounced with Sample A. That is, the amount of torque force required to remove the hexagonal nuts from the build surface due to the hot water conditioning is progressively reduced through the use of COLD BLOC 3792 and Sample A. COLD BLOC 3792 thus reduced the force requirements from the bare surface by only nearly about 5%. However, the amount of torque force required to remove the hexagonal nuts from the build surface having been coated with Sample A after hot water conditioning is reduced dramatically—by over about 90%.

Figure 2:
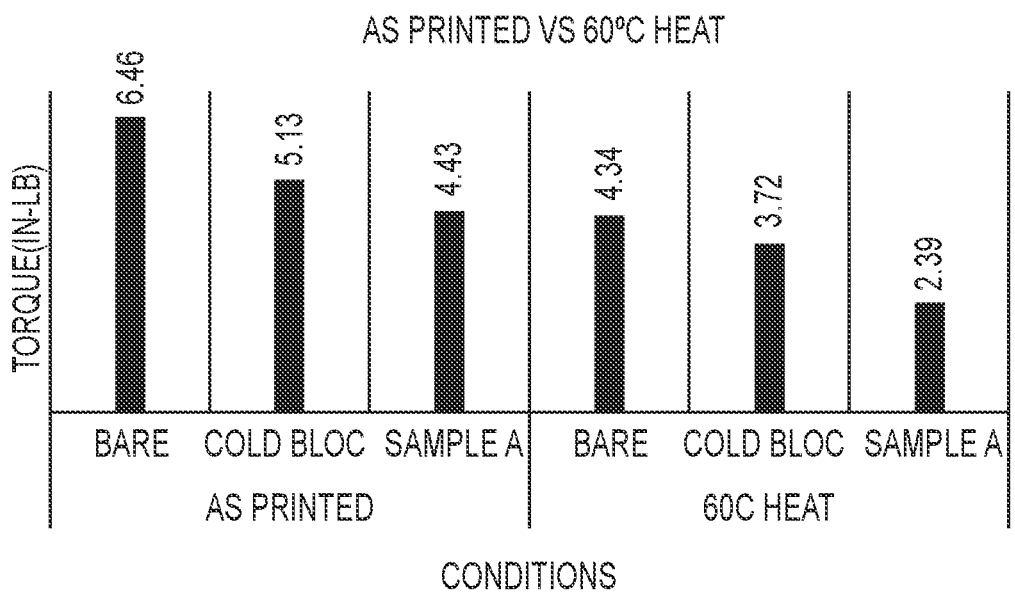
FIG. 2 depicts a bar chart of torque values on the Y axis against the various samples on the bare build substrate and after 60° C. conditioning.
Figure 3:
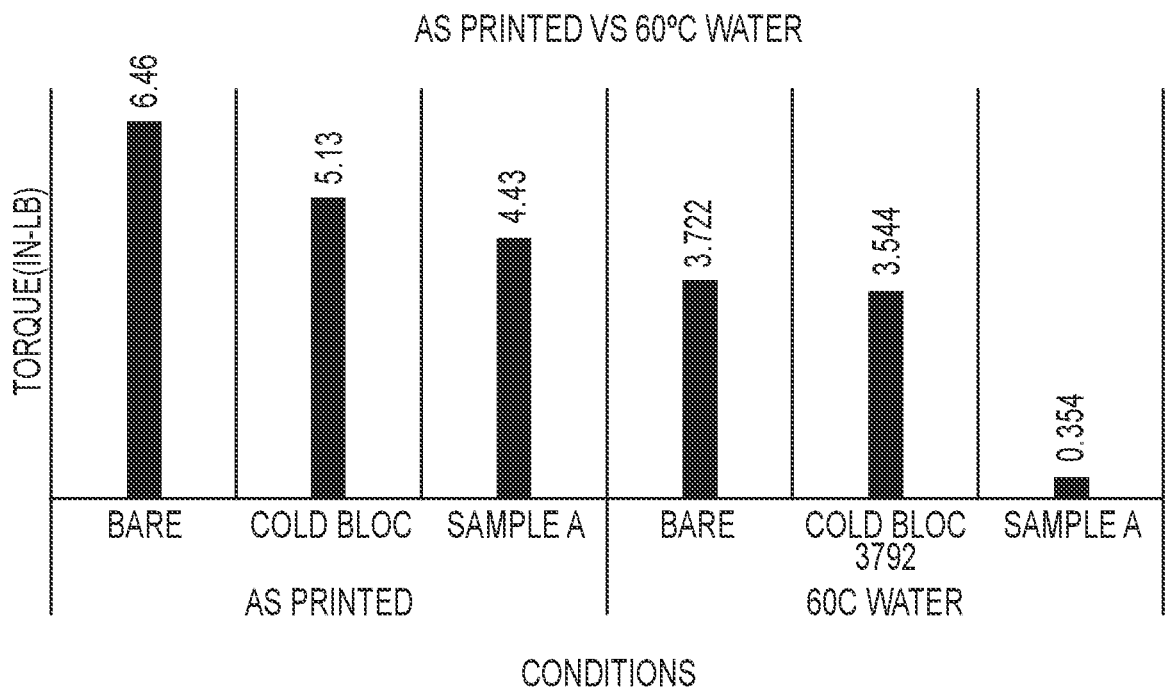
FIG. 3 depicts a bar chart of torque values on the Y axis against the various samples on the bare build substrate and after 60° C. water conditioning.
Figure 4:
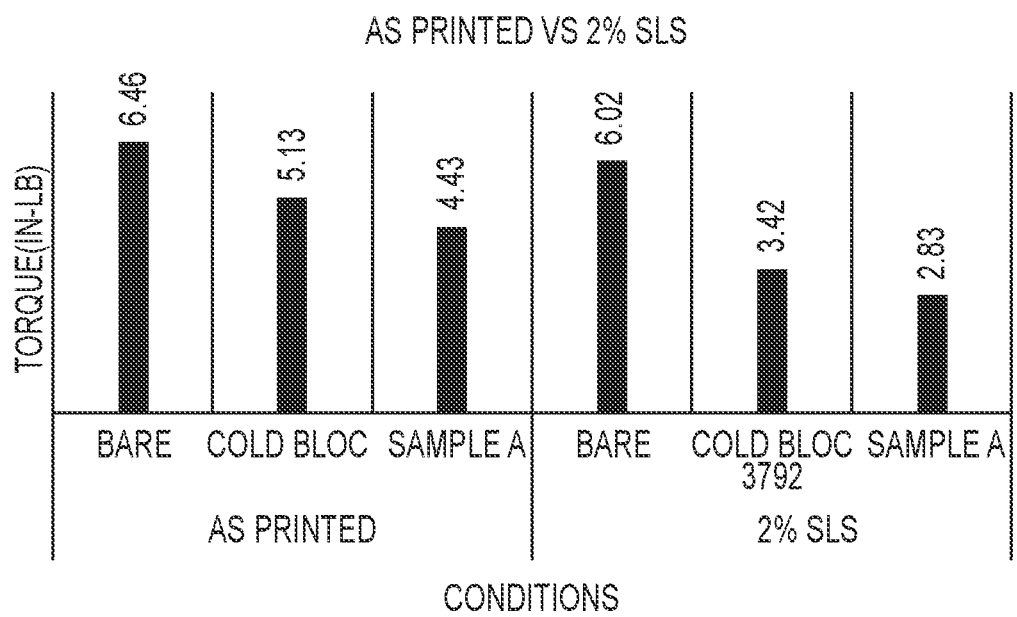
FIG. 4 depicts a bar chart of torque values on the Y axis against the various samples on the bare build substrate and after aqueous surfactant conditioning.

From the data captured in these tables and shown in FIGS. 1-4, the use of hot (i.e., 60° C.) water conditioning was on average the best conditioning method evaluated for reducing the torque required for removing the three dimensional printed part from the build substrate.

In each case, the cured curable composition (whether COLD BLOC 3792 or Sample A) separated from the build surface, and then may be peeled away from the three dimensional printed part.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:
1. A method of facilitating the removal from a build substrate of a three-dimensional printed part made by additive manufacturing, the method comprising the steps of:
   A. disposing onto at least a portion of a surface of the build substrate a curable coating composition comprising a (meth)acrylate component having as constituents a combination of (meth)acrylate monomers, oligomers, polymers, and/or resins;
   B. exposing the curable coating composition to radiation in the electromagnetic spectrum suitable to cure the curable coating composition to form a cured coating composition on the surface of the build substrate;
   C. performing additive manufacturing using a resin to form a three-dimensional part on the cured coating composition disposed on the build substrate, said three- dimensional printed part made according to data indicating a pre-determined pattern; and D. removing the so-formed part from the build substrate, further comprising after step C but before step D, conditioning the so-formed three-dimensional printed part under one or more of an elevated temperature, hot water, or aqueous detergent so as to lower a torque force required for said removing to less than about 3 in-lb.

2. The method of claim 1, wherein for step B, the curable coating composition is cured by exposure to radiation in the ultraviolet spectrum.

3. The method of claim 1, wherein the curable coating composition is disposed on the surface of the build substrate at a thickness in the range of about 0.5 mm to about 2 mm.

4. The method of claim 1, wherein the curable coating composition is disposed on the surface of the build substrate at a thickness of about 1 mm.

5. The method of claim 1, wherein the cured coating composition is retained on the three-dimensional printed part after step D, further comprising after step D, removing from the three-dimensional printed part the cured coating composition formed in step B.

6. The method of claim 1, wherein the cured coating composition is debondable.

7. The method of claim 1, wherein cured coating composition is debondable under the torque force.

8. The method of claim 1, wherein the cured coating composition is debondable from the surface of the build substrate under a torque force of less than about 6 in-lb prior to said conditioning.

9. The method of claim 1,
wherein the elevated temperature comprises a temperature in the range of from about 45° C. to about 80° C.,
the hot water comprises water at a temperature in the range of from about 45° C. to about 80° C.,
and the aqueous detergent comprises aqueous detergent at a temperature of from about 15° C. to about 40° C.

10. The method of claim 1, wherein the elevated temperature comprises a 60° C. temperature, the hot water comprises 60° C. hot water, and the aqueous detergent comprises aqueous detergent at room temperature, and wherein the conditioning is applied for a period of time of about 30 minutes.

11. The method of claim 10, wherein the cured coating composition is debondable from the surface of the build substrate under a torque force of 2.39 in-lb after conditioning under the elevated temperature, a torque force of 0.354 in-lb after conditioning under the hot water, and a torque force of 2.83 in-lb after conditioning under the aqueous detergent.

12. The method of 1, wherein the conditioning is under the elevated temperature, and wherein the cured coating composition is debondable from the surface of the build substrate under a torque force of 2.39 in-lb after said conditioning.

13. The method of claim 1, wherein the conditioning is under the hot water, and wherein the cured coating composition is debondable from the surface of the build substrate under a torque force of 0.354 in-lb after said conditioning.

14. The method of claim 1, wherein the conditioning is under the aqueous detergent, and wherein the cured coating composition is debondable from the surface of the build substrate under a torque force of 2.83 in-lb after said conditioning.

15. The method of claim 1, wherein the curable coating composition comprises:
(a) a (meth)acrylate component comprising as constituents:
(i) one or more (meth)acrylate-functionalised oligomers, polymers, or resins selected from the group consisting of (meth)acrylate-functionalized urethanes, (meth)acrylate-functionalized polyester urethanes, (meth)acrylate-functionalized polyepoxides, (meth)acrylate-functionalized poly(alkyleneoxides), and (meth)acrylate-functionalized polybutadienes, or combinations thereof; and
(ii) one or more (meth)acrylate monomer components;
(b) optionally, a release agent; and
(c) a photoinitiator.

16. The method of claim 15, wherein the wherein the one or more (meth)acrylate-functionalised oligomers, polymers, or resins, are present in an amount of from about 30 to about 80 percent by weight, and the one or more (meth)acrylate monomers are present in an amount of from about 10 to about 50 percent by weight; and the photoinitiator is present in an amount of from about 0.001 to about 5 percent by weight, based on the total weight of the curable coating composition.

17. The method of claim 1, wherein the curable coating composition further comprises a release agent.

18. The method of claim 17, wherein the release agent is present in an amount of from about 0.5 to 10 percent by weight based on the total weight of the curable coating composition.

19. The method of claim 1, wherein the curable coating composition comprises a (meth)acrylate component having as constituents polyethylene glycol diacrylate in an amount of greater than about 25 to less than about 50 percent by weight, isobornyl acrylate in an amount of greater than about 10 to less than about 50 percent by weight, and 2-hydroxyethyl acrylate in an amount greater than about 0.25 to less than about 2.5 percent by weight, and as a photoinitiator, phenyl bis(2,4,6-trimethylbenzoyl)-phosphine oxide.

* * * * *